D. H. PLANK & A. C. FINNEY.
STARTING DEVICE FOR ELECTRIC MOTORS.
APPLICATION FILED MAR. 1, 1910.

962,856.

Patented June 28, 1910.

Witnesses:
Irving E. Steers.
J. Ellis Eber.

Inventors
David H. Plank,
Alfred C. Finney,
by Albert G. Davis
Their Attorney.

UNITED STATES PATENT OFFICE.

DAVID H. PLANK AND ALFRED C. FINNEY, OF SCHENECTADY, NEW YORK, ASSIGNORS TO GENERAL ELECTRIC COMPANY, A CORPORATION OF NEW YORK.

STARTING DEVICE FOR ELECTRIC MOTORS.

962,856.  Specification of Letters Patent.  Patented June 28, 1910.

Application filed March 1, 1910. Serial No. 546,619.

*To all whom it may concern:*

Be it known that we, DAVID H. PLANK and ALFRED C. FINNEY, citizens of the United States, residing at Schenectady, county of Schenectady, State of New York, have invented certain new and useful Improvements in Starting Devices for Electric Motors, of which the following is a specification.

This invention relates to controlling devices for electric motors and has for its object the provision of means whereby the motor may be started and brought to running speed in a reliable and efficient manner.

Our invention relates more specifically to the starting of electric motors by means of a transformer in which the arrangement is such that the motor is first connected to the supply circuit through the transformer and then connected directly to the line.

One of the objects of our invention is to provide a starting system of this character in which the various starting operations are controlled by the operator in such a way that improper handling is impossible.

In carrying out our invention we provide a group of electromagnetic switches for connecting the motor to the supply circuit through the transformer and a second group of switches for connecting the motor directly to the supply circuit. We also provide a number of manually operated switches for controlling the electromagnetic switches. Each group of switches is provided with a manually operated switch for closing them and another switch for opening them. We also provide means whereby the running switches cannot be closed until the starting switches have been closed and opened. Further, in order to insure that the running switches will be closed within a proper interval after the starting switches have been closed and opened and thus prevent the motor from slowing down before it is connected directly to line, we provide a time limit device which prevents the closing of the running switches except within a predetermined interval between the opening of the starting switches and the closing of the running switches.

Other objects of our invention will appear in the course of the following specification in which we have shown our invention embodied in concrete mechanism for purposes of illustration.

Figure 1:
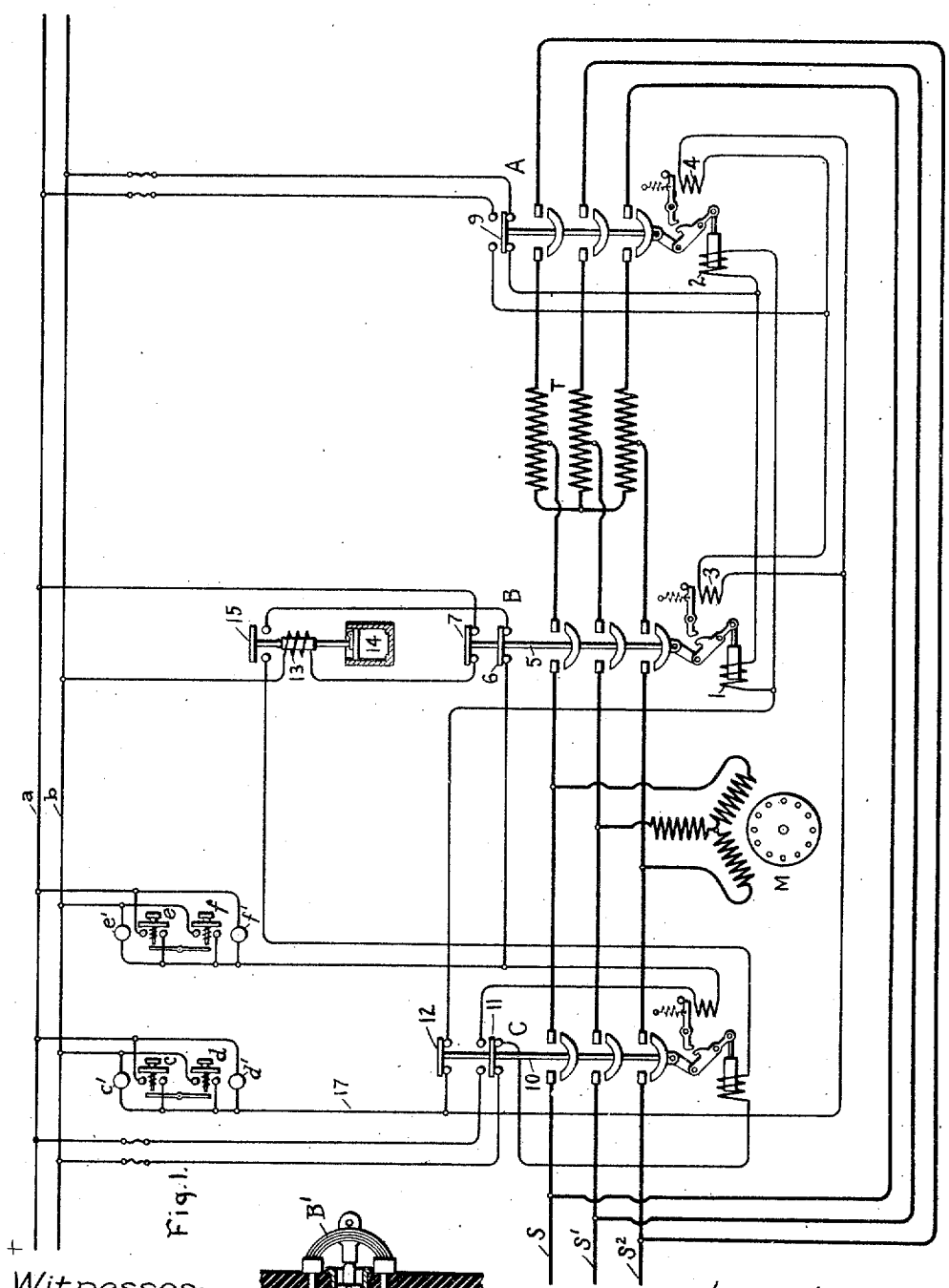
Figure 2:
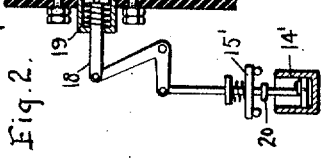

In the drawings, Figure 1 represents a diagrammatic view of a starting system embodying our invention; and Fig. 2 is a detail of a modified form of time limit device.

Referring to the drawings, M represents an induction motor of the squirrel cage type and T represents a transformer. This transformer we have shown in the form of an autotransformer although we do not limit our invention to this particular form of the device. The motor is shown in the form of a three-phase motor for purposes of illustration. Two groups of switches are provided for connecting the motor to the supply circuit through the transformer and a third group for connecting the motor directly to the supply circuit. The first two groups of switches taken together are called the starting switches, group A being the magnetizing switches which connect the transformer to the line and B the switches which connect the motor to the transformer. These two sets of switches are employed in order that both ends of the transformer may be actually cut out of circuit when the motor is running. A third group of switches C is employed for connecting the motor directly to the line. Each group of switches is arranged in the form of a single contactor so as to close and open the three phases simultaneously. The contactors A and B are arranged to be operated together by operating coils 1 and 2 and trip coils 3 and 4 connected respectively in parallel. The operating rod 5 of contactor B is provided with two bridging contacts 6 and 7 which normally close the control circuits, as hereinafter described. The operating rod of contactor A has a single bridging contact 9 which alternately bridges two sets of contacts, depending upon whether the contactor is open or closed. Contactor C is operated in a manner similar to A and B and its operating rod 10 is provided with two bridging contacts 11 and 12, for purposes hereinafter described. In order to prevent the closing of contactor C until the contactors A and B have been closed we provide a time limit device consisting of a solenoid 13, the core of which is retarded in its upper movement by a dash pot 14 which permits the core to drop quickly. A bridging contact 15 is arranged to be engaged by the core of the solenoid in its raised position so as to lift it out of engagement with its contacts.

The arrangement of circuits and mode of operation of our device are as follows: The solenoid 13 is connected across the control circuit a b which is intended to be constantly energized. A plurality of push-buttons c d e and f are provided so as to be operated consecutively by the operator. Push-buttons c and d are mechanically interlocked so that only one can be closed at a time. This is also true of e and f. To start the motor the push-button c is pressed. This closes the contactors A and B, the circuit being as follows: from line a, through the push-button c, conductor 17, bridging contact 12, solenoids 1 and 2 in parallel, bridging contact 9, and back to line b. Switches A and B immediately close and connect the motor to the supply circuit S, S', S² through the transformer. As soon as the switches are closed the operating solenoids 1 and 2 are deënergized at the bridging contact 9 and the contactors are latched closed. Before the push-button c was closed the bridging contact 15 was raised by the energization of the solenoid 13 so as to prevent the accidental closing of the contactor C. As soon, however, as switch B is closed, the solenoid 13 is deënergized at the contact 7, whereupon the plunger of the solenoid drops and the contact 15 bridges its contacts. The contactor C cannot, however, be operated because its operating circuit is broken at the contact 6. It is necessary for the contactor B to again open before C can be closed. The operator now presses the button d which energizes the trip coils 3 and 4 and opens the contactors A and B. The opening of B again energizes the solenoid which starts to pull up its core which, however, is retarded by the dash pot. The current is now entirely off from the motor and it is essential that the motor be quickly connected to the supply circuit before the speed is appreciably reduced. The operator now presses the button e to close the contactor C and connect the motor to the line, but he must do this before the operating circuit of C is opened at the contact 15. In other words, the operator must do it before the plunger of solenoid 13 reaches the end of its travel. If he waits too long he must start again. The motor is now normally running and the transformer entirely cut out. In order to stop the motor the button f is pressed, which energizes the trip coil of the switch C and restores the parts to their original position.

It will be observed that it is impossible to close the contactor C before the contactors A and B are closed. It is also impossible to close the contactor C while the contactors A and B are closed, because the operating circuit of C is opened at contact 6. It will also be observed that it is impossible to close the contactors A and B while C is closed, since the operating circuits of the contactors A and B pass through the contact 12. It is, therefore, necessary that the push-buttons be operated in their proper way, namely, by pushing button c to connect the motor to the supply circuit through the transformer; push-button d to disconnect the transformer from the motor and from the line; push-button e to connect the motor to the supply circuit directly; push-button f to open the running switches and stop the motor.

In order to indicate to the operator the condition of the circuits at any time, we have provided a series of indicating lamps, one for each push-button. The lamp d' is lighted continuously when the motor is not running, so as to indicate that there is current on the control circuit. The circuit of this lamp is through the bridging contact 12 and operating coils of contactors A and B. The lamp, however, has a high resistance and does not allow sufficient current to pass through the coils 1 and 2 to make them operate. When now the push-button c is pressed, the lamp c' lights, preferably a red light, and the lamp d', which may be a green light, goes out. When the push-button d is pressed to open the starting switches, the green light again lights and the red light goes out. At this time the lamp f' also lights and remains lighted until its circuit is opened at contact 15. When the push-button e is pressed to connect the motor directly to line, the lamp e', which may be another red light, is lighted, the circuit being through the trip coil of contactor C. This lamp is also a high resistance lamp and prevents the operation of the trip coil. The lamps at all times, therefore, indicate the condition of the circuits and it is impossible for the operator to make a mistake.

In the arrangement shown in Fig. 2, we have shown a device which might be employed instead of the solenoid 13 for a time limit device. In this case the time limit device is mechanical instead of electrical. The arrangement is attached to one of the switches, as, for instance, the switch B' corresponding to contactor B. When this switch is closed the contact 15' is pressed down by the plunger 18, thereby closing the circuit corresponding to that closed by contact 15. When the switch B' is opened the spring 19 pushes the plunger 18 slowly outward, being retarded by the dash pot 14'. After a predetermined interval the contact 15' is engaged by the lug 20 and the circuit opens, thereby establishing mechanically what is done electrically in Fig. 1.

It will be seen that we have provided a very simple and efficient means for starting alternating current motors and bringing them up to speed through the manipulation of manually operated switches, and while we have described our invention as embodied in concrete mechanism for purposes of illustration, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is,—

1. In combination with an alternating current motor, a supply circuit, a transformer, a plurality of electromagnetically operated switches for first connecting the motor to the supply circuit through the transformer and then connecting the motor directly to the supply circuit, and means whereby the motor can be connected directly to the supply circuit only within a predetermined interval after it has been connected and disconnected from the supply circuit through the transformer.

2. In combination with an alternating current motor, a supply circuit, a transformer, a plurality of electromagnetically operated starting switches for first connecting the motor to the supply circuit through the transformer, a plurality of electromagnetically operated running switches for connecting the motor directly to the supply circuit, and means whereby the running switches can be closed only within a predetermined interval after the starting switches have been closed and opened.

3. In combination with an alternating current motor, a supply circuit, a transformer, a plurality of electromagnetically operated starting switches for connecting the motor directly to the supply circuit through the transformer, electromagnetically operated running switches for connecting the motor to the supply circuit, manually operated switches for opening and closing said electromagnetic switches, and means whereby the running switches can be closed only within a predetermined interval after the starting switches have been closed and opened.

4. In combination with an alternating current motor, a supply circuit, a transformer, a plurality of electromagnetically operated switches for connecting the motor directly to the supply circuit through the transformer, electromagnetically operated running switches for connecting the motor to the supply circuit, a manually operated switch for controlling the closing of each group of electromagnetic switches, a second manually operated switch for controlling the opening of each group of switches, and means whereby the running switches can be closed only after the starting switches have been closed and opened.

5. In combination with an alternating current motor, a supply circuit, a transformer, a plurality of electromagnetically operated switches for connecting the motor to the supply circuit through the transformer, electromagnetically operated running switches for connecting the motor to the supply circuit, a manually operated switch for controlling the closing of each group of electromagnetic switches, a second manually operated switch for controlling the opening of each group of switches, and means whereby the running switches can be closed only within a predetermined interval after the starting switches have been closed and opened.

6. In combination with an alternating current motor, a supply circuit, a transformer, a plurality of switches for first connecting the motor to the supply circuit through the transformer and then connecting the motor directly to the supply circuit, and means whereby the motor can be connected directly to the supply circuit only within a predetermined interval after it has been connected and disconnected from the supply circuit through the transformer.

In witness whereof, we have hereunto set our hands this 28th day of February, 1910.

DAVID H. PLANK.
ALFRED C. FINNEY.

Witnesses:
BENJAMIN B. HULL,
HELEN ORFORD.